(12) United States Patent
Kusakabe et al.

(10) Patent No.: US 10,212,442 B2
(45) Date of Patent: Feb. 19, 2019

(54) MOVING PICTURE ENCODING APPARATUS AND MOVING PICTURE ENCODING METHOD

(71) Applicant: Panasonic Intellectual Property Management Co., Ltd., Osaka (JP)

(72) Inventors: Toshihiko Kusakabe, Osaka (JP); Kiyofumi Abe, Osaka (JP); Hideyuki Ohgose, Osaka (JP); Shinji Kitamura, Kyoto (JP); Takashi Hashimoto, Hyogo (JP); Yuki Maruyama, Osaka (JP); Tatsuro Juri, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 97 days.

(21) Appl. No.: 15/293,759

(22) Filed: Oct. 14, 2016

(65) Prior Publication Data

US 2017/0251226 A1    Aug. 31, 2017

(30) Foreign Application Priority Data

Feb. 26, 2016  (JP) ................. 2016-035451
Sep. 23, 2016  (JP) ................. 2016-186111

(51) Int. Cl.
*H04B 1/66* (2006.01)
*H04N 19/436* (2014.01)
*H04N 19/70* (2014.01)

(52) U.S. Cl.
CPC .......... *H04N 19/436* (2014.11); *H04N 19/70* (2014.11)

(58) Field of Classification Search
CPC ...... H04N 19/174; H04N 19/70; H04N 19/91; H04N 19/436; H04N 19/44; H04N 19/13
USPC ......................................... 375/240
See application file for complete search history.

(56) References Cited

U.S. PATENT DOCUMENTS

2007/0206676 A1* 9/2007 Yamazaki ............ G11B 27/034
                                                       375/240.12
2010/0246662 A1* 9/2010 Koto .................. H04N 21/8547
                                                        375/240.1

OTHER PUBLICATIONS

ITU-T Telecommunication Standardization Sector of ITU, Series H: Audiovisual and Multimedia Systems, Infrastructure of audiovisual services—Coding of moving video, "High Efficiency video coding", Recommendation ITU-T H.265, Apr. 2013.

* cited by examiner

*Primary Examiner* — Frederick D Bailey
*Assistant Examiner* — Masum Billah
(74) *Attorney, Agent, or Firm* — Wenderoth, Lind & Ponack, L.L.P.

(57) ABSTRACT

The image encoding apparatus which encodes, on a per block basis, a current picture included in a moving picture includes: an encoder which outputs a first encoded stream including, in the following arrangement order, (i) slice data obtained by encoding a slice included in the current picture and including a plurality of block lines and (ii) a slice header including information indicating a code amount of each of the plurality of block lines; and an exchanger which exchanges arrangement positions of the slice data and the slice header in the first encoded stream.

3 Claims, 8 Drawing Sheets

MOVING PICTURE ENCODING APPARATUS AND MOVING PICTURE ENCODING METHOD

CROSS REFERENCE TO RELATED APPLICATIONS

This application claims the benefit of priority of Japanese Patent Application Number 2016-035451 filed on Feb. 26, 2016 and priority of Japanese Patent Application Number 2016-186111 filed on Sep. 23, 2016, the entire content of which is hereby incorporated by reference.

BACKGROUND

1. Technical Field

The present disclosure relates to a moving picture encoding apparatus which encodes, on a per block basis, a current picture included in a moving picture.

2. Description of the Related Art

Non-patent Literature 1 (Recommendation ITU-T H.265, High efficiency video coding, 2013/4) discloses High Efficiency Video Coding (HEVC) which is a video compression standard. In HEVC, Wavefront Parallel Processing (WPP) is employed. WPP may also be called entropy coding synchronization.

WPP is a coding tool which enables parallel processing on a per block line basis. In WPP, a slice header includes information (entry_point_offset) indicating the code amount of each of block lines included in a slice. Based on the slice header, a decoder parses the code amount of each of the block lines, and thereby being able to determine which part of the slice data includes data positioned at the beginning of the block line, and to read the plurality of block lines in parallel.

SUMMARY

The present disclosure provides an image encoding apparatus which is capable of reducing the complexity of processing for including, in an encoded stream, slice header including information indicating the code amount of each of block lines.

The image encoding apparatus according to the present disclosure is a moving picture encoding apparatus which encodes, on a per block basis, a current picture included in a moving picture, and includes: an encoder which outputs a first encoded stream including, in the following arrangement order, (i) slice data obtained by encoding a slice included in the current picture and including a plurality of block lines and (ii) a slice header including information indicating a code amount of each of the plurality of block lines; and an exchanger which exchanges arrangement positions of the slice data and the slice header in the first encoded stream.

The image encoding apparatus according to the present disclosure is capable of reducing the complexity of processing for including, in an encoded stream, slice header including information indicating the code amount of each of block lines.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Hereinafter, embodiments are described by arbitrarily referring to the drawings. It is to be noted that unnecessarily detailed descriptions may not be provided. For example, already well-known matters may not be described in detail, and substantially the same constituent elements may not be described in an overlapping manner. This is for preventing the following descriptions from being unnecessarily redundant and for helping a person skilled in the art understand the present disclosure.

It is to be noted that the Inventors provide the attached drawings and the following descriptions so that a person skilled in the art to fully appreciate the present disclosure, and are not intended to limit the subject matter of each claim based on the drawings and descriptions.

Hereinafter, embodiments are described with reference to FIGS. 1 to 7.
[1-1. Configuration]
[1-1-1. Configuration of Moving Picture Encoding Apparatus]

Figure 1:
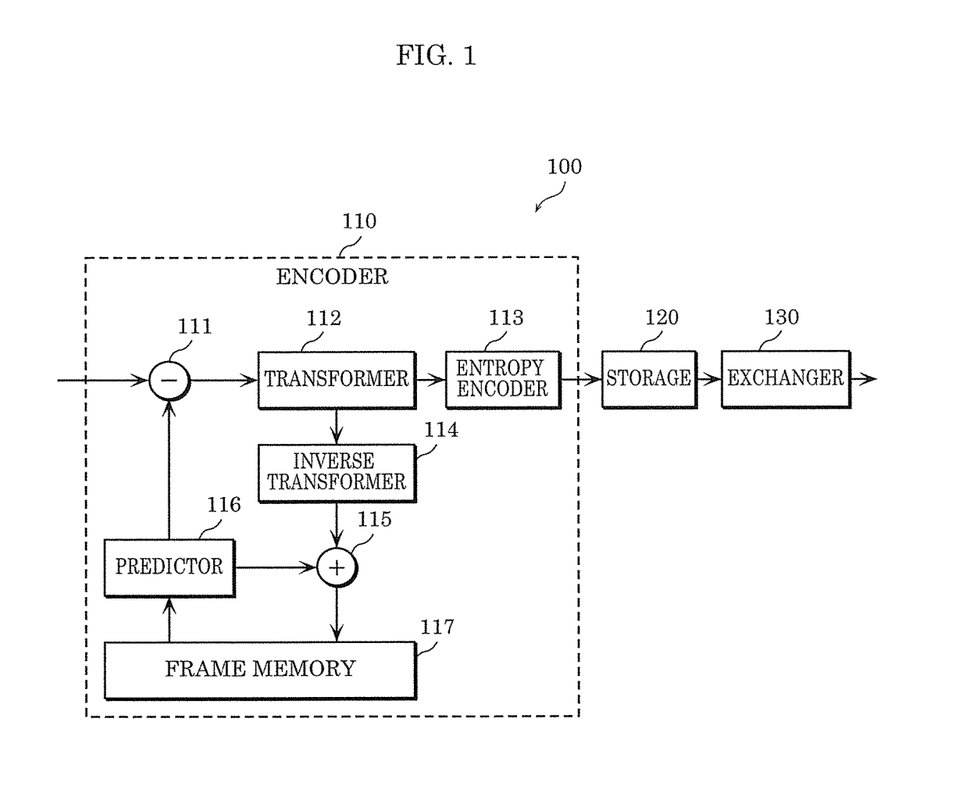
FIG. 1 is a block diagram illustrating a configuration of a moving picture encoding apparatus according to an embodiment.

FIG. 1 is a block diagram illustrating a configuration of a moving picture encoding apparatus according to an embodiment.

Moving picture encoding apparatus 100 encodes, on a per block basis, a current picture included in a moving picture. More specifically, moving picture encoding apparatus 100 encodes a plurality of pictures on a per block basis according to a moving picture compression standard (such as HEVC).

As illustrated in FIG. 1, moving picture encoding apparatus 100 includes encoder 110, storage 120, and exchanger 130. Hereinafter, details of each of the constituent elements are described.

Encoder 110 encodes a slice including a plurality of block lines, and outputs the encoded slice data to storage 120. Furthermore, encoder 110 outputs, to storage 120, a slice header including information indicating the code amount of each of block lines (hereinafter referred to as code amount information). As a result, a first encoded stream including the slice data and the slice header in this listed arrangement order is stored in storage 120.

Figure 2:
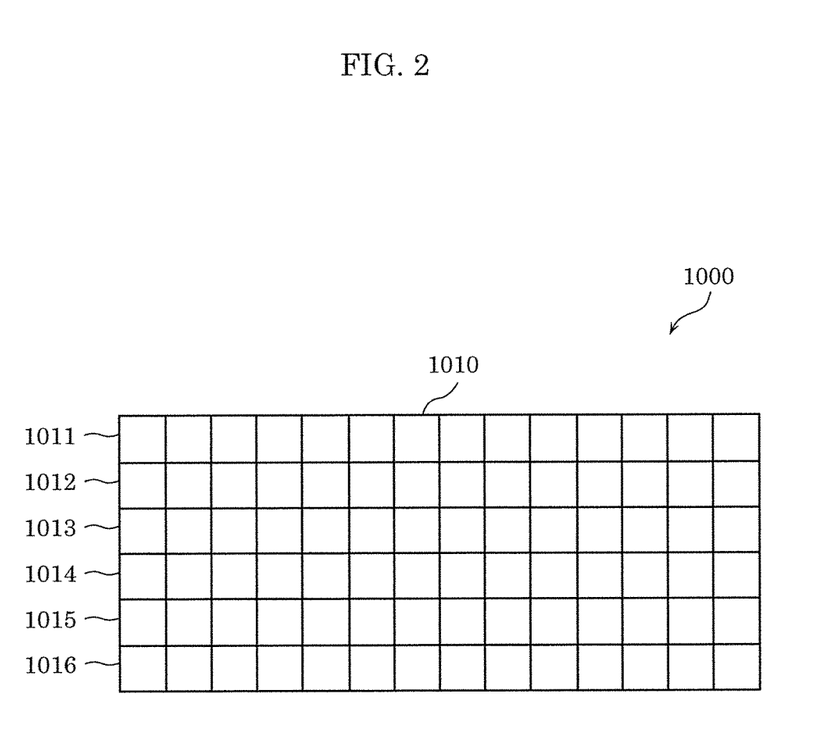
FIG. 2 is a diagram illustrating an example of an encoding structure of a picture.

Here, block lines are described with reference to FIG. 2. FIG. 2 is a diagram illustrating an example of an encoding structure of a picture.

In FIG. 2, picture 1000 includes single slice 1010. A slice is a group of blocks consecutively included in a picture. Here, slice 1010 includes six block lines 1011 to 1016.

A block line is a group of blocks arranged consecutively in a line in the horizontal direction. For example, a block corresponds to a coding tree unit (CTU) in HEVC. Each of blocks is a group of pixels (for example, 16×16 pixels, 32×32 pixels, and 64×64 pixels), and may be divided into a plurality of sub-blocks (for example, coding units (CU), prediction units (PU), and transform units (TU)).

As described above, storage 120 stores the first encoded stream including the slice data and the slice header in this listed arrangement order. More specifically, storage 120 is implemented as, for example, a dynamic random access memory (DRAM).

Exchanger 130 exchanges the arrangement positions of the slice data and the slice header in the first encoded stream stored in storage 120, and thereby generating a second encoded stream including the slice header and the slice data in this listed arrangement order. This exchange may be performed, for example, together with multiplexing of video signals and audio signals, transform into a predetermined container format, or other processing.

Figure 3:
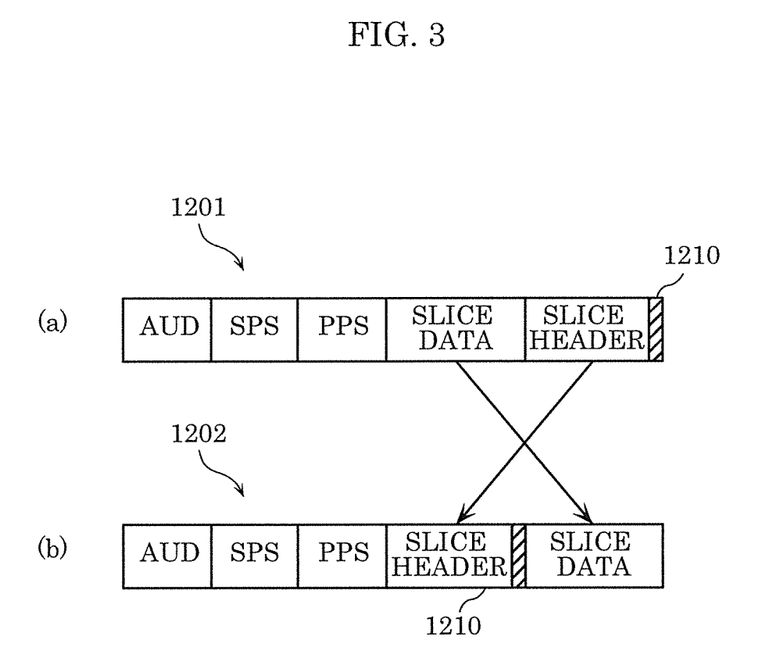
FIG. 3 is a diagram illustrating examples of encoded streams according to the embodiment.

The exchange of the arrangement positions of the slice data and the slice header in the first encoded stream is described with reference to FIG. 3. FIG. 3 is a diagram illustrating examples of encoded streams according to the embodiment. In FIG. 3, (a) denotes first encoded stream 1201 which is an encoded stream before the exchange, and (b) denotes second encoded stream 1202 which is an encoded stream after the exchange.

AUD is an abbreviation of an access unit delimiter, SPS is an abbreviation of a sequence parameter set, and PPS is an abbreviation of a picture parameter set. The slice header includes code amount information 1210 indicating the code amount of each of the block lines. For example, in HEVC, code amount information 1210 corresponds to entry_point_offset.

As illustrated in FIG. 3, exchanger 130 exchanges the arrangement positions of the slice data and the slice header in first encoded stream 1201, and thereby generating second encoded stream 1202 including the slice header and the slice data in this listed arrangement order. In other words, exchanger 130 transforms first encoded stream 1201 which does not conform to the standard, into second encoded stream 1202 which conforms to the standard.

Here, the internal configuration of encoder 110 is described. As illustrated in FIG. 1, encoder 110 includes subtractor 111, transformer 112, entropy encoder 113, inverse transformer 114, adder 115, predictor 116, and frame memory 117.

Subtractor 111 subtracts a current block of a prediction image from a current block of an original image, and outputs a current block which is a residual image to transformer 112.

Transformer 112 performs frequency transform and quantization on the current block which is the residual image, and outputs a current block of quantized coefficients to entropy encoder 113 and inverse transformer 114.

Entropy encoder 113 performs entropy coding on the current block of quantized coefficients, and outputs the encoded data to storage 120. The plurality of blocks included in a block line are encoded through the entropy coding, and the encoded data of the block line is stored in storage 120 as a part of the slice data.

More specifically, entropy encoder 113 encodes the current block of quantized coefficients through, for example, context-based adaptive binary arithmetic coding (CABAC). At this time, if the current block is a block positioned at the beginning of the block line, entropy encoder 113 initializes a probability table for encoding the block line including the current block, using the probability table of an adjacent block line which is positioned immediately above the block line.

Furthermore, entropy encoder 113 performs entropy coding on the slice header including the code amount information of the block line, and outputs the encoded slice header to storage 120. As a result, a first encoded stream including the slice data and the slice header in this listed arrangement order is stored in storage 120.

Inverse transformer 114 performs inverse quantization and inverse frequency transform on the current block of quantized coefficients, and outputs a current block of a residual image to adder 115.

Adder 115 adds the current block of a residual image and a current block of a prediction image, and outputs a current block of a reconstructed image to frame memory 117. As a result, the reconstructed picture including the plurality of blocks of the reconstructed images is stored in frame memory 117.

Predictor 116 outputs the current block of the prediction image to subtractor 111 and adder 115. For example, predictor 116 performs inter prediction with reference to a reference picture stored in frame memory 117, and outputs a current block of a prediction image to subtractor 111 and adder 115. Alternatively, for example, predictor 116 may perform intra prediction with reference to a block which is spatially adjacent to a current block, and output a current block of a prediction image to subtractor 111 and adder 115.

[1-1-2. Configuration of Moving Picture Decoding Apparatus]

Figure 4:
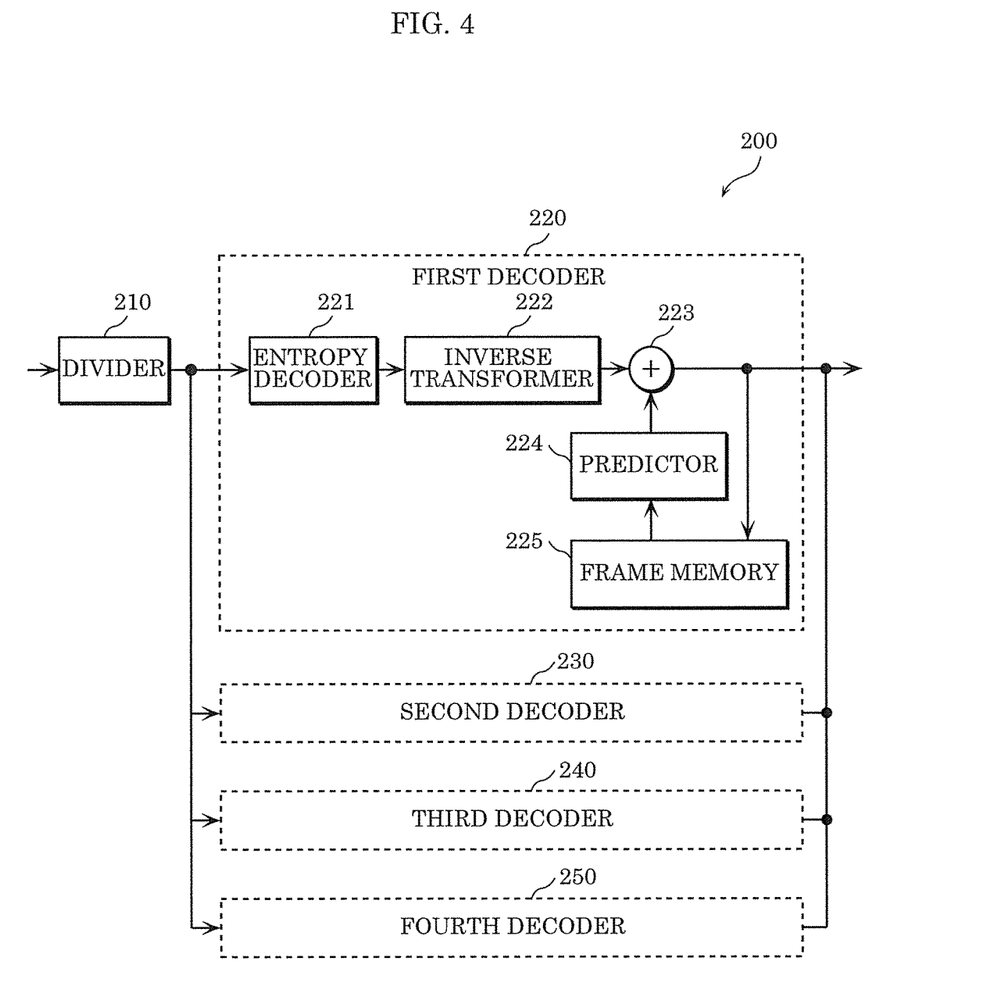
FIG. 4 is a block diagram illustrating a configuration of a moving picture decoding apparatus according to an embodiment.

Next, a moving picture decoding apparatus which decodes a second encoded stream output from moving picture encoding apparatus 100 is described. FIG. 4 is a block diagram illustrating a configuration of a moving picture decoding apparatus according to the embodiment. Moving picture decoding apparatus 200 decodes the second encoded stream to reconstruct a moving picture.

As illustrated in FIG. 4, moving picture decoding apparatus 200 includes divider 210, first decoder 220, second decoder 230, third decoder 240, and fourth decoder 250. Hereinafter, details of each of the constituent elements are described.

Divider 210 parses the code amount information of each of the plurality of block lines, based on the slice header included in the second encoded stream, and determines the starting position of the data of each block line included in the slice data, based on the parsed information. Divider 210 divides the slice data into data of the plurality of block lines, based on the determined starting position, and outputs the data of each of the block lines to any one of first decoder 220, second decoder 230, third decoder 240, and forth decoder 250.

First decoder 220, second decoder 230, third decoder 240, and forth decoder 250 decode by WPP the plurality of block lines obtained from divider 210. More specifically, each of the decoders decodes a current block line to be decoded, with a delay which corresponds to a predetermined number of blocks (for example, two blocks) from when a block line positioned immediately above the current block line to be decoded was decoded.

Figure 5:
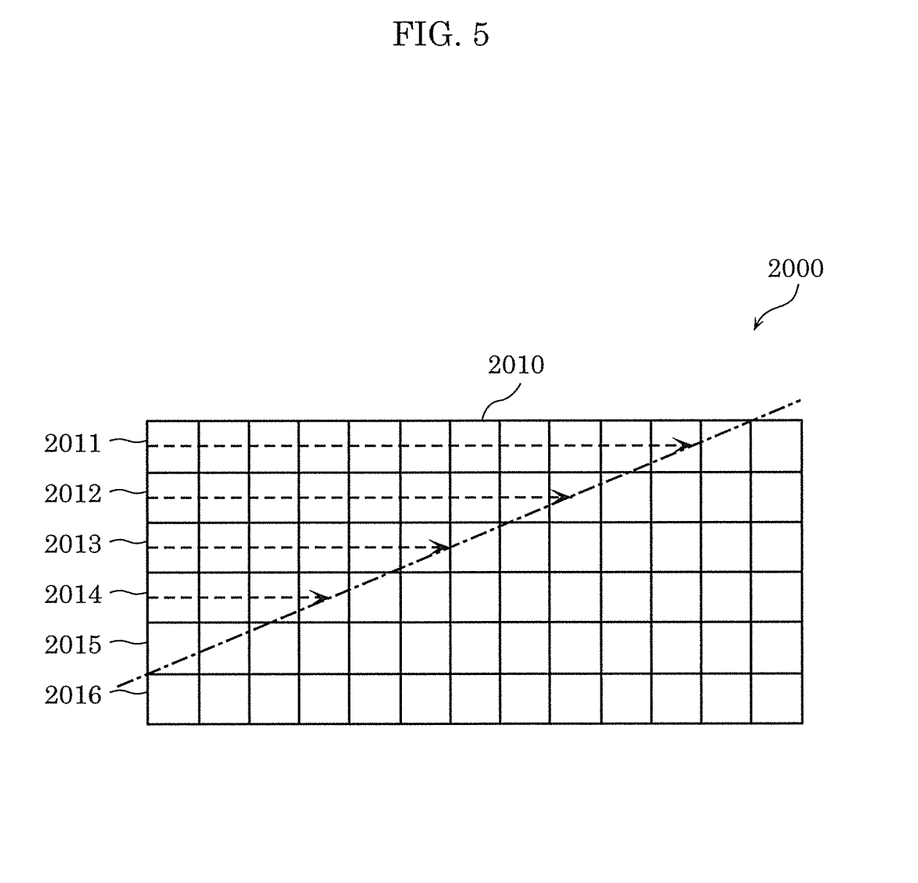
FIG. 5 is a diagram for illustrating decoding by WPP.

Here, decoding by WPP is described with reference to FIG. 5. FIG. 5 is a diagram for illustrating decoding by WPP. In FIG. 5, picture 2000 includes single slice 2010. Slice 2010 includes six block lines 2011 to 2016.

Here, descriptions are given assuming that block lines 2011, 2012, 2013, and 2014 are decoded by first decoder 220, second decoder 230, third decoder 240, and fourth decoder 250, respectively, in this listed order starting with the leftmost block in each block line.

At this time, second decoder 230 decodes block line 2012 with a delay corresponding to two blocks from when block line 2011 was decoded by first decoder 220. Likewise, third decoder 240 decodes block line 2013 with a delay corresponding to two blocks from when block line 2012 was decoded by second decoder 230. Likewise, fourth decoder 250 decodes block line 2014 with a delay corresponding to two blocks from when block line 2013 was decoded by third decoder 240.

In this way, the four block lines 2011 to 2014 are decoded in parallel by the four decoders (that are first decoder 220, second decoder 230, third decoder 240, and fourth decoder 250). It should be noted that first decoder 220 and second decoder 230 decode block lines 2015 and 2016 in parallel in the same manner when decoding of block lines 2011 and 2012 is completed.

Here, the internal configuration of first decoder 220 representing the four decoders is described. It is to be noted that the internal configurations of second decoder 230, third decoder 240, and fourth decoder 250 are substantially the same as first decoder 220, and thus they are not illustrated in the drawings and not described herein. As illustrated in FIG. 4, first decoder 220 includes entropy decoder 221, inverse transformer 222, adder 223, predictor 224, and frame memory 225.

Entropy decoder 221 performs entropy decoding on encoded data of encoded block to be decoded (resulting current block), and outputs the current block of quantized coefficients to inverse transformer 222.

More specifically, entropy decoder 221 decodes encoded data of the current block through, for example, context-based adaptive binary arithmetic decoding (CABAD). At this time, if the current block is a block positioned at the beginning of a block line, entropy decoder 221 initializes a probability table for encoding the block line including the current block, using the probability table of an adjacent block line which is positioned immediately above the block line.

Inverse transformer 222 performs inverse quantization and inverse frequency transform on the current block of quantized coefficients, and outputs a current block of a residual image to adder 223.

Adder 223 adds the current block of a residual image and a current block of a prediction image, and outputs a current block of a reconstructed image to frame memory 225 and an external device (for example, a display). In frame memory 225, a reconstructed picture including a plurality of blocks of reconstructed images is stored as a reference picture.

Predictor 224 outputs the current block of the prediction image to adder 223. For example, predictor 224 performs inter prediction with reference to a reference picture stored in frame memory 225, and outputs a current block of a prediction image to adder 223. In addition, for example, predictor 224 may perform intra prediction with reference to a block which is spatially adjacent to a current block, and output a current block of a prediction image to adder 223.

The prediction method used in predictor 224 is the same as the prediction method used in moving picture encoding apparatus 100.

[1-2. Operations]

Operations performed by moving image encoding apparatus 100 and moving image decoding apparatus 200 configured in this way are described below.

[1-2-1. Operations Performed by Moving Picture Encoding Apparatus]

Figure 6:
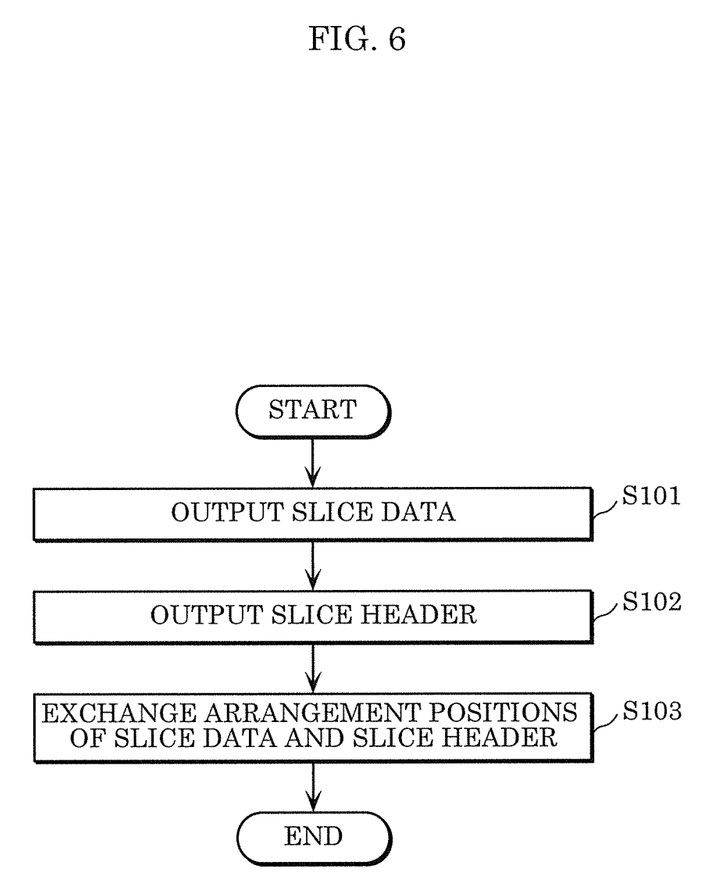
FIG. 6 is a flowchart indicating operations performed by the moving picture encoding apparatus according to the embodiment.

FIG. 6 is a flowchart indicating operations performed by moving picture encoding apparatus 100 according to the embodiment. The operations performed by moving picture encoding apparatus 100 are described in detail with reference to a flowchart.

In addition, encoder 110 encodes a slice including a plurality of block lines to generate slice data, and outputs the slice data to storage 120 as a first part of the first encoded stream (S101). More specifically, encoder 110 encodes each of the plurality of block lines on a per block basis. Subsequently, encoder 110 outputs the slice data including the encoded plurality of block lines to storage 120 as the first part of the first encoded stream.

Furthermore, encoder 110 calculates the code amount of each of the encoded plurality of block lines. In addition, encoder 110 outputs, next to the slice data, a slice header including calculated code amount information to storage 120 as a second part of the first encoded stream (S102). As a result, a first encoded stream including the slice data and the slice header in this listed arrangement order is stored in storage 120.

Exchanger 130 exchanges the arrangement positions of the slice data and the slice header in the first encoded stream including the slice data and the slice header in this listed arrangement order (S103). As a result, the first encoded stream which includes the slice data and the slice header in this listed arrangement order and does not conform to the standard is converted into a second encoded stream which includes the slice header and the slice data in this listed arrangement order and conforms to the standard.

[1-2-2. Operations Performed by Moving Picture Decoding Apparatus]

Figure 7:
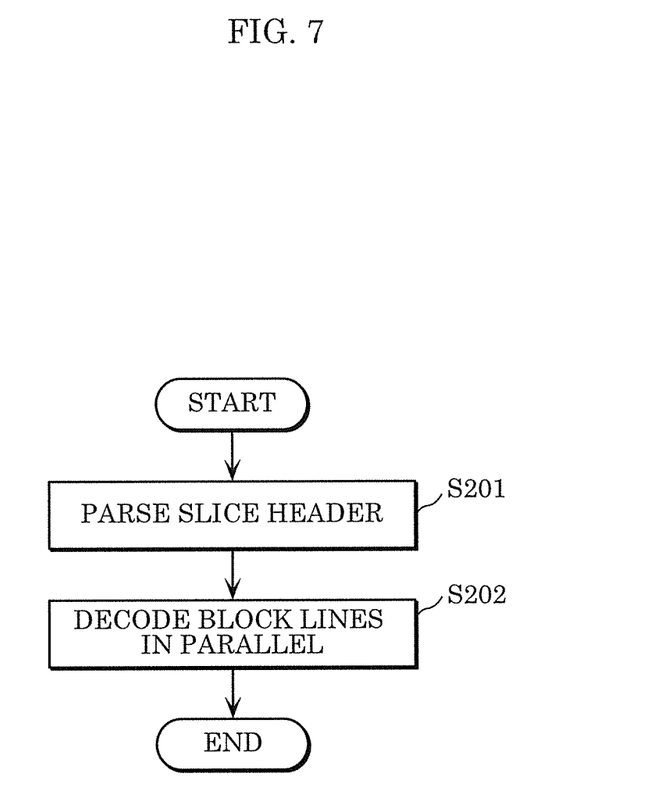
FIG. 7 is a flowchart indicating operations performed by the moving picture decoding apparatus according to the embodiment.

FIG. 7 is a flowchart indicating operations performed by moving picture decoding apparatus 200 according to the embodiment. The operations performed by moving picture decoding apparatus 200 are described in detail with reference to a flowchart.

First, divider 210 parses code amount information of each of block lines included in a slice header in a second encoded stream, and divides the slice data for each block line according to the code amount information of the block line (S201).

The plurality of decoders (first decoder 220 to fourth decoder 250) decode the plurality of block lines in parallel (S202). More specifically, as illustrated in FIG. 5, the plurality of decoders decode the plurality of block lines in parallel with a delay corresponding to a predetermined number of blocks (two blocks in FIG. 5).

[1-3. Effects etc.]

As described above, in this embodiment, moving picture encoding apparatus 100 includes encoder 110 and exchanger 130. Encoder 110 outputs a first encoded stream including slice data obtained by encoding a slice including a plurality of block lines and a slice header including code amount information of each of the plurality of block lines in this listed arrangement order. Exchanger 130 exchanges the arrangement positions of the slice data and the slice header in the first encoded stream in which the slice data and the slice header are arranged in this listed arrangement order.

In general, in the case of encoding by hardware, encoded data items are output to a buffer in encoding order to generate a stream. The code amount information of a block line is information obtained after coding of the block line is completed, and thus it is impossible to encode the code amount information until the block lines is encoded. Accordingly, in order to arrange a slice header including code amount information before slice data including data of each block line, there is a need to arrange the code amount information encoded after the encoding of the data of each block line before the slice data by tracking back the stream. This makes coding complex.

For example, there is a method for generating a second encoded stream including slice header and slice data in this listed arrangement order by storing dummy information in a slice header area in which the code amount of each block line is stored and replacing the dummy information with code amount information after the encoding of each block line is completed and the code amount of each block line is determined. However, in this method, there is a need to return a pointer to a slice header area after output of the slice header and the slice data are completed, which makes the processing complex. Furthermore, when the code amount of code amount information itself of each block line is different from the code amount of the dummy information, complex processing such as rearrangement of various kinds of data in an encoded stream is required.

On the other hand, in this embodiment, it is possible to generate a second encoded stream including a slice header and slice data in this listed arrangement order in a comparatively easy manner by generating a first encoded stream including a slice header after slice data and exchanging the arrangement positions of the slice data and the slice header in the first encoded stream.

VARIATIONS OF EMBODIMENT

The above embodiment has been described as an example of a technique disclosed in the present application. However, techniques according to the present disclosure are not limited to the above embodiment, and are applicable to other embodiments obtainable by arbitrarily making modification, replacement, addition, omission, etc. In addition, it is possible to obtain a new embodiment by arbitrarily combining some of the constituent elements described in the above embodiment and other elements. Hereinafter, variations of the embodiment are described as examples.

For example, although a case in which a picture includes a single slice is described in the above embodiment, a picture may include a plurality of slices.

In addition, although moving picture decoding apparatus 200 decodes four block lines in parallel in the embodiment, this is a non-limiting example. Moving picture decoding apparatus 200 may decode the plurality of block lines one by one. In this case, moving picture decoding apparatus 200 does not need to include a plurality of decoders and may include a single decoder. In addition, moving picture decoding apparatus 200 may decode two, three, or five or more block lines in parallel.

In addition, each of moving picture encoding apparatus 100 and moving picture decoding apparatus 200 may selectively include a plurality of constituent elements in the present disclosure. Likewise, each of a moving picture encoding method and a moving picture decoding method may selectively include a plurality of processes in the present disclosure. For example, moving picture encoding apparatus 100 does not always include storage 120. In this case, it is only necessary that either storage device connected to moving picture encoding apparatus 100 via a communication network or removable medium which is attachable to or detachable from moving picture encoding apparatus 100 be used instead of storage 120.

In addition, each of the constituent elements in the present disclosure may be an electronic circuit. These circuits may be configured as one circuit as a whole, or as separate circuits. In addition, each of the circuits may be a general-purpose circuit, or an exclusive circuit.

In addition, each of the processes in the present disclosure may be executed by a computer. For example, the computer executes the processes in the present disclosure by executing a program using hardware resources such as a memory and an input and output circuits. More specifically, the computer executes each of the processes by, for example, obtaining data to be processed from the memory or the input and output circuits etc. calculating the data, and outputting the calculation result to the memory or the input and output circuits etc.

In addition, a program for executing each of the processes in the present disclosure may be recorded in a non-transitory recording medium such as a computer-readable CD-ROM. In this case, the computer executes each of the processes by reading the program from the non-transitory recording medium and executing the program.

Furthermore, moving picture encoding apparatus 100 described in the embodiment may be applied to various apparatuses. Hereinafter, application examples of moving picture encoding apparatus 100 are described with reference to FIGS. 8 to 10.

Figure 8:
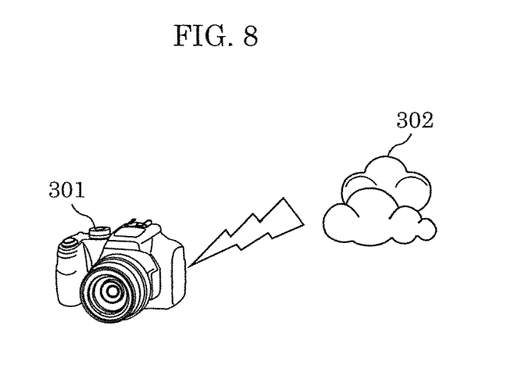
FIG. 8 is a conceptual diagram illustrating a first application example of a moving picture encoding apparatus according to an embodiment.

FIG. 8 is a conceptual diagram illustrating a first application example of moving picture encoding apparatus 100 illustrated in FIG. 1. FIG. 8 illustrates digital camera 301 and cloud system 302. Digital camera 301 is an example of moving picture encoding apparatus 100. Digital camera 301 may include moving picture encoding apparatus 100.

Digital camera 301 encodes a moving picture according to a procedure described in the embodiment. More specifically, digital camera 301 outputs a first encoded stream including slice data obtained by encoding a slice including a plurality of block lines and a slice header including code amount information of each of the plurality of block lines in this listed arrangement order. Subsequently, digital camera 301 exchanges the arrangement positions of the slice data and the slice header in the first encoded stream.

Since the procedure described in the embodiment is applied in the coding of the moving picture, it is possible to reduce complexity in the process for including the slice header including the code amount information of each block line in the encoded stream.

Figure 9:
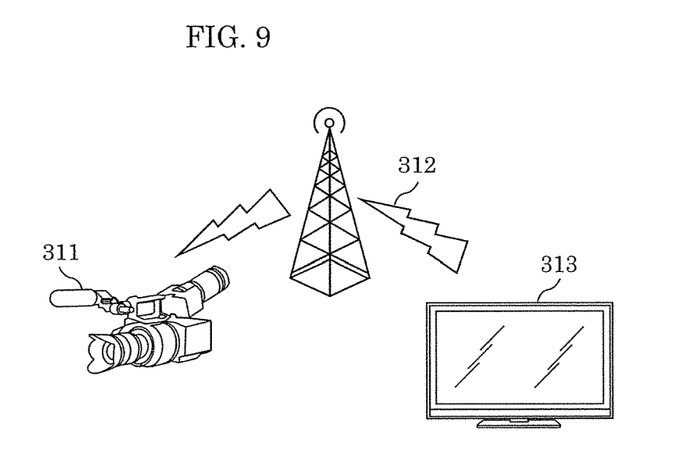
FIG. 9 is a conceptual diagram illustrating a second application example of a moving picture encoding apparatus according to an embodiment.

FIG. 9 is a conceptual diagram illustrating a second application example of moving picture encoding apparatus 100 illustrated in FIG. 1. FIG. 9 illustrates camera for broadcasting 311, broadcasting station 312, and television receiver 313. Camera for broadcasting 311 is an example of moving picture encoding apparatus 100. Camera for broadcasting 311 may include moving picture encoding apparatus 100.

Camera for broadcasting 311 encodes a moving picture according to a procedure described in the embodiment. More specifically, camera for broadcasting 311 outputs a first encoded stream including slice data obtained by encoding a slice including a plurality of block lines and a slice header including code amount information of each of the plurality of block lines in this listed arrangement order. Subsequently, camera for broadcasting 311 exchanges the arrangement positions of the slice data and the slice header in the first encoded stream.

Since the procedure described in the embodiment is applied in the encoding of the moving picture, it is possible to reduce complexity in the process for including the slice header including the code amount information of each block line in the encoded stream.

Figure 10:
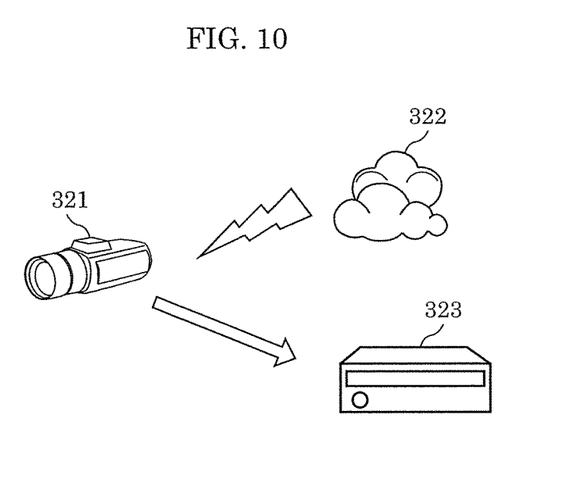
FIG. 10 is a conceptual diagram illustrating a third application example of a moving picture encoding apparatus according to an embodiment.

FIG. 10 is a conceptual diagram illustrating a third application example of moving picture encoding apparatus 100 illustrated in FIG. 1. FIG. 10 illustrates monitoring camera 321, cloud system 322, and video recorder 323. Monitoring camera 321 is an example of moving picture encoding apparatus 100. Monitoring camera 321 may include moving picture encoding apparatus 100.

Monitoring camera 321 encodes a moving picture according to a procedure described in the embodiment. More specifically, monitoring camera 321 outputs a first encoded stream including slice data obtained by encoding a slice including a plurality of block lines and a slice header including code amount information of each of the plurality of block lines in this listed arrangement order. Subsequently, camera for broadcasting 321 exchanges the arrangement positions of the slice data and the slice header in the first encoded stream.

Since the procedure described in the embodiment is applied in the encoding of the moving picture, it is possible to reduce complexity in the process for including the slice header including the code amount information of each block line in the encoded stream.

The above embodiment has been described as an example of a technique according to the present disclosure. For this purpose, the attached drawings and the detailed descriptions have been provided.

Accordingly, the constituent elements illustrated in the attached drawings and described in DETAILED DESCRIPTION OF THE EMBODIMENT may include not only constituent elements which are essential to solve the problem but also constituent elements which are not essential to solve the problem and provided to illustrate the technique. For this reason, these inessential constituent elements should not be regarded as essential ones directly because the inessential constituent elements are illustrated in the attached drawings and described in DETAILED DESCRIPTION OF THE EMBODIMENT.

In addition, since the above embodiment has been provided to illustrate the technique according to the present disclosure, it is possible to make various kinds of modification, replacement, addition, omission etc. within the scope of the claims or equivalents.

INDUSTRIAL APPLICABILITY

The present disclosure is applicable to moving picture encoding apparatuses etc. More specifically, the present disclosure is applicable to digital cameras, cameras for fixed point observation, monitoring cameras, surveillance cameras, or the like.

What is claimed is:

1. A moving picture encoding apparatus which encodes, on a per block basis, a current picture included in a moving picture, the moving picture encoding apparatus comprising:
    an encoder which outputs a first encoded stream including, in the following arrangement order, (i) slice data obtained by encoding a slice included in the current picture and including a plurality of block lines and (ii) a slice header including information indicating a code amount of each of the plurality of block lines; and
    an exchanger which exchanges arrangement positions of the slice data and the slice header in the first encoded stream to conform to a predetermined coding standard.

2. The moving picture encoding apparatus according to claim 1,
    wherein the encoder:
    (i) encodes each of the plurality of block lines on a per block basis;
    (ii) outputs the slice data including the plurality of block lines which have been encoded, as a first part of the first encoded stream;
    (iii) calculates the code amount of each of the plurality of block lines which have been encoded; and
    (iv) outputs the slice header including information indicating the code amount which has been calculated, as a second part of the first encoded stream.

3. A moving picture encoding method for encoding, on a per block basis, a current picture included in a moving picture, the moving picture encoding method comprising:
    outputting, using an encoder, a first encoded stream including, in the following arrangement order, (i) slice data obtained by encoding a slice included in the current picture and including a plurality of block lines and (ii) a slice header including information indicating a code amount of each of the plurality of block lines; and
    exchanging, using an exchanger, arrangement positions of the slice data and the slice header in the first encoded stream to conform to a predetermined coding standard.

* * * * *